US010553196B1

(12) United States Patent
Stewart

(10) Patent No.: US 10,553,196 B1
(45) Date of Patent: Feb. 4, 2020

(54) DIRECTIONAL NOISE-CANCELLING AND SOUND DETECTION SYSTEM AND METHOD FOR SOUND TARGETED HEARING AND IMAGING

(71) Applicant: Michael A. Stewart, Sparks, NV (US)

(72) Inventor: Michael A. Stewart, Sparks, NV (US)

(*) Notice: Subject to any disclaimer, the term of this patent is extended or adjusted under 35 U.S.C. 154(b) by 0 days.

(21) Appl. No.: 16/260,887

(22) Filed: Jan. 29, 2019

Related U.S. Application Data

(60) Provisional application No. 62/756,543, filed on Nov. 6, 2018.

(51) Int. Cl.
| | |
|---|---|
| *H04R 3/00* | (2006.01) |
| *G10K 11/178* | (2006.01) |
| *H04N 5/232* | (2006.01) |
| *G06F 3/16* | (2006.01) |
| *H04R 1/40* | (2006.01) |

(52) U.S. Cl.
CPC ........ *G10K 11/17823* (2018.01); *G06F 3/165* (2013.01); *H04N 5/23238* (2013.01); *H04R 1/406* (2013.01); *H04R 3/005* (2013.01); *G10K 2210/1081* (2013.01); *G10K 2210/3046* (2013.01); *G10K 2210/509* (2013.01)

(58) Field of Classification Search
CPC ............ H04R 2499/11; H04R 2430/20; H04R 2203/12; H04R 2420/07; H04R 2430/23; H04R 2430/21
USPC ............................................ 381/77, 92, 122
See application file for complete search history.

(56) References Cited

U.S. PATENT DOCUMENTS

| | | |
|---|---|---|
| 4,712,244 A | 12/1987 | Zwicker et al. |
| 4,751,738 A | 6/1988 | Widrow et al. |
| 4,773,095 A | 9/1988 | Zwicker et al. |
| 7,165,029 B2 | 1/2007 | Nefian |
| 7,760,898 B2 | 7/2010 | Howell et al. |
| 8,139,801 B2 | 3/2012 | Sipkema et al. |
| 8,583,428 B2 | 11/2013 | Tashev et al. |
| 8,635,066 B2 | 1/2014 | Morrison |
| 8,766,765 B2 | 7/2014 | Hamadallah |

(Continued)

FOREIGN PATENT DOCUMENTS

| | | |
|---|---|---|
| EP | 1643769 | 4/2006 |
| WO | WO2004066273 | 8/2004 |
| WO | WO2011130083 | 10/2011 |

*Primary Examiner* — George C Monikang
(74) *Attorney, Agent, or Firm* — Jerry Haynes Law

(57) ABSTRACT

A directional noise-cancelling and sound detection system and method for sound targeted hearing and imaging is donned on the ears. The system provides a microphone array that selectively focuses on audio signals from at least one sound source to enable selective listening to the audio signal and directional noise cancelling, including actively reducing background sounds. The system provides an image capturing device that works in tandem with the microphone array to generate images of, and enable viewing of, the sound source. The system also allows the audio signal and the image to be captured from a 360° range relative to the earpiece. A processor operatively connects to the microphone array and the image capturing device to analyze the audio signal and the image for selectively listening, restricting, and adjusting the intensity of sound. A digital display control unit regulates selection, intensity, and restriction of sound transmitted through the earpiece.

19 Claims, 6 Drawing Sheets

(56) References Cited

U.S. PATENT DOCUMENTS

| | | |
|---|---|---|
| 8,842,177 B2 | 9/2014 | Beal et al. |
| 9,696,551 B2 | 3/2017 | Pedersen et al. |
| 2008/0176609 A1* | 7/2008 | Kim .................. H04M 1/035 455/575.1 |
| 2008/0260189 A1 | 10/2008 | Schobben |
| 2009/0022341 A1* | 1/2009 | Shams ................ G01H 11/02 381/174 |
| 2011/0091057 A1* | 4/2011 | Derkx ................ H04R 25/407 381/313 |
| 2011/0096939 A1* | 4/2011 | Ichimura ............ H04S 7/304 381/74 |
| 2011/0164141 A1 | 7/2011 | Tico et al. |
| 2012/0243691 A1* | 9/2012 | Lin .................... H04R 5/04 381/22 |
| 2013/0225199 A1* | 8/2013 | Shaw ................ G01S 5/06 455/456.1 |
| 2014/0270244 A1 | 8/2014 | Fan |
| 2014/0376753 A1* | 12/2014 | Nystrom ............ H04R 29/00 381/309 |
| 2015/0296289 A1* | 10/2015 | Lakkundi ............ H04R 3/005 381/92 |
| 2016/0165340 A1* | 6/2016 | Benattar ............ H04R 1/406 381/92 |

\* cited by examiner

DIRECTIONAL NOISE-CANCELLING AND SOUND DETECTION SYSTEM AND METHOD FOR SOUND TARGETED HEARING AND IMAGING

CROSS-REFERENCE TO RELATED APPLICATIONS

This application claims the benefits of U.S. provisional application No. 62/756,543, filed Nov. 6, 2018 and entitled APPARATUS AND METHOD FOR TARGETED HEARING ASSISTANCE AND IMAGING, which provisional application is incorporated by reference herein in its entirety.

FIELD OF THE INVENTION

The present invention relates generally to a directional noise-cancelling and sound detection system and method for sound targeted hearing and imaging. More so, the directional noise-cancelling and sound detection system provides a microphone array that selectively focuses on audio signals from at least one sound source to enable selective listening to the audio signal and directional noise cancelling, including actively reducing background sounds; and an image capturing device that works in tandem with the microphone array to generate images of, and enable viewing of, the sound source from a 360° range relative to the earpiece.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Typically, hearing aid devices can be used to help people improve their hearing despite natural losses in high-frequency discrimination. Hearing aid devices typically amplify sounds from all directions and equalize the frequency response to correspond with the user's specific hearing loss, so that the user can hear the sounds more easily. Unfortunately, many conventional hearing aid devices amplify all sounds, including ambient noise, making it difficult to distinguish an intended source (e.g., a person's voice) from the rest of the ambient noise. Alternatively, generic hearing amplifier devices are available. But these aids make all sounds equally louder.

It is also known that, while hearing aids compensate for specific frequency deficiencies in the human hearing, they have the tendency to cause the spatial cues to be lost. Without spatial cues, the human brain cannot calculate the direction of the sound. This is what makes understanding a conversation in a crowded restaurant possible for many people without hearing degradation. The brain can actively focus on the conversation, and ignore or depress the other restaurant noises.

In many instances, a solution involves in-ear digital hearing aids. Such hearing aids include multiple microphones that provide tunable directionality so that a hearing aid has a preferred direction of sensitivity, usually tuned to be forward facing. In this way, the hearing aid increases the sound from the conversation ahead of the user, without increasing all of the background noise.

Often, a microphone array and a microphone noise-cancelling array work together to replicate this phenomenon. The microphone array has an array of a plurality of omnidirectional microphones and equivalently define a directivity by emphasizing a target sound and suppressing noise. Further, the microphone array apparatus is capable of detecting the position of a sound source on the basis of a relationship among the phases of output signals of the microphones.

Other proposals have involved directional hearing earpieces and methods of use. The problem with these earpieces is that they do not enable selective listening to the audio signal and directional noise cancelling. Also, they do not simultaneously capture an image of the sound source that is being listened to by the user. Even though the above cited directional hearing earpieces meet some of the needs of the market, a directional noise-cancelling and sound detection system and method for sound targeted hearing and imaging that provides a microphone array that selectively focuses on audio signals from at least one sound source to enable selective listening to the audio signal and directional noise cancelling, including actively reducing background sounds; and an image capturing device that works in tandem with the microphone array to generate images of, and enable viewing of, the sound source from a 360° range relative to the earpiece, is still desired.

SUMMARY

Illustrative embodiments of the disclosure are generally directed to a directional noise-cancelling and sound detection system and method for sound targeted hearing and imaging. The directional noise-cancelling and sound detection system is configured to equivalently define a directivity by emphasizing a target sound and suppressing noise. The system provides a microphone array that selectively focuses on at least one audio signal from at least one sound source to enable selective listening to the audio signal and directional noise cancelling, including actively reducing all background sounds.

In some embodiments, the directional noise-cancelling and sound detection system provides an image capturing device that works in tandem with the microphone array to generate images of, and enable viewing of, the sound source. The system is also unique in allowing the audio signal and the image to be captured from a 360° range relative to the earpiece.

In some embodiments, the directional noise-cancelling and sound detection system comprises an earpiece having a microphone array. The microphone array comprises a plurality of microphones that are operable to capture at least one audio signal emanating from at least one sound source. The microphones capturing the audio signal in a 360° range relative to the earpiece.

The directional noise-cancelling and sound detection system may further include an image capturing device. The image capturing device comprises a panoramic lens. The image capturing device is configured to capture an image of the sound source in the 360° range relative to the earpiece.

The directional noise-cancelling and sound detection system may further include a processor that is operatively connected to the microphone array and the image capturing device. The processor is configured to analyze the audio signal and the image, and then to selectively listen, restrict, and adjust the intensity of the sound. The system may further include an electronic circuitry that is operatively connected to the processor. The electronic circuitry generates a reproduced sound based on the captured audio signal.

The directional noise-cancelling and sound detection system may further include a digital display control unit that is operatively connected to the microphones and the processor. The digital display control unit works to regulate selection, intensity, and restriction of the reproduced sound while being transmitted through the earpiece. The digital display control unit further works to regulate the intensity of the reproduced sound that is transmitted through the earpiece.

The digital display control unit further works to regulate the portion of the reproduced sound that is restricted from passing through the earpiece. The digital display control unit further works to display the image of the sound source that is captured by the image capturing device. In this manner, the directionality of the microphones is based on the audio signal and the image.

In a second aspect, the microphone array comprises a plurality of microphones.

In another aspect, the microphones are arranged in a planar array.

In another aspect, the microphones include an omnidirectional microphone, or a directional microphone.

In another aspect, the earpiece comprises a housing.

In another aspect, the processor utilizes microphone polarization to focus the captured audio signal through the earpiece.

In another aspect, the image capturing device includes at least one of the following: a camera, a fisheye visual daylight camera, a thermal imager, a LiDAR, radar, and a device for generating an electronic image of the environment.

In another aspect, the image capturing device comprises a rotating mirror, or a stationary mirror, or both.

In another aspect, the image capturing device is operable while integral with the earpiece, or remotely operable from the earpiece.

In another aspect, the panoramic lens of the image capturing device comprises an ultra-wide angle fisheye lens.

In another aspect, the digital display control unit is operable to display a GUI interface.

In another aspect, the system comprises a mobile communication device, the mobile communication device operatively connected to the microphones and the processor.

In another aspect, the mobile communication device regulates selection of the reproduced sound transmitted through the earpiece.

In another aspect, the mobile communication device regulates the intensity of the reproduced sound transmitted through the earpiece.

In another aspect, the mobile communication device regulates the portion of the reproduced sound restricted through the earpiece.

In another aspect, the mobile communication device displays the image of the sound source.

In another aspect, the earpiece comprises Bluetooth connectivity with A2DP or HPF profiles.

In another aspect, the system comprises a wireless radio.

In another aspect, the processor comprises firmware, or software, or both to process the audio signal.

One objective of the present invention is to detect and directionally track at least one audio signal emanating from at least one sound source, while also restricting undesirable background noise.

Another objective is to focus on acoustic signals and images of the sound source.

Another objective is to allow a user to selectively listen to an audio signal in a crowded environment.

Yet another objective is to block noise other than that emanating from the sound source.

Yet another objective is to image the sound source through thermal energy, optics, facial recognition, or motion; and then coordinate the image with the audio signal from the sound source.

Yet another objective is to differentiate between different sounds in a crowded room.

Yet another objective is to provide a Bluetooth connection to allow the user to use wireless in ear headphones, Bluetooth headset, or hearing aids to receive a signal from the system.

Yet another objective is to control the focus and intensity of the audio signal emanating from the sound source through use of a digital display control unit or a mobile communication device, such as a smart phone and software app.

Yet another objective is to assist the hearing impaired user to listen in a more focused manner.

Yet another objective is to assist in firearm sound targeted through identification and focusing on a sound source.

Yet another objective is to provide an easy to use and wearable sound targeting and noise cancelling system.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

A directional noise-cancelling and sound detection system 100 and method 700 for sound targeted hearing and imaging is referenced in FIGS. 1-7B.

Figure 1:
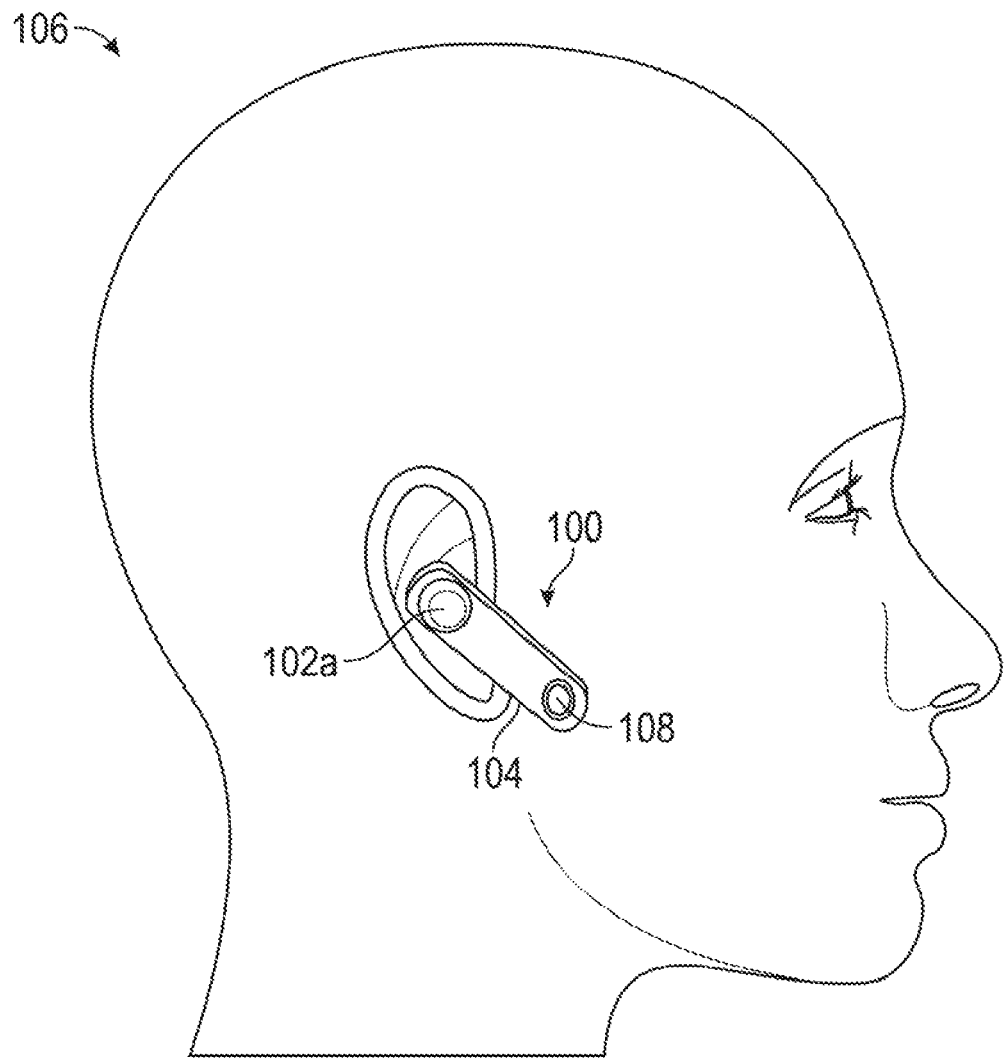
FIG. 1 illustrates a side view of a directional noise-cancelling and sound detection system being donned on the ear of a user, in accordance with an embodiment of the present invention.

As referenced in FIG. 1, the directional noise-cancelling and sound detection system 100, hereafter "system 100" is operable to equivalently define a directivity by emphasizing a target sound and suppressing noise while being donned onto one or both ears of a user 106. The system 100 provides at least one earpiece 102a-b that is donned by a user 106 for operation of the system 100. The earpiece 102a-b comprises a microphone array 108 that selectively focuses on at least one audio signal 612 emanating from at least one sound source 608a-c, 610a-b. The earpiece 102a-b comprises various electrical and processing components that enable selective listening to the audio signal 612, directional noise cancelling, including actively reducing all background sound from undesirable sound sources 610a, 610b.

In some embodiments, the microphone array 108 comprises a plurality of microphones 300a-h that are operable to capture at least one audio signal 612 emanating from at least one sound source 608a-c, 610a-b. The microphones 300a-h capture the audio signal 612 in a 360° range relative to the earpiece 102a-b.

In other embodiments, the system 100 provides an image capturing device 310 that works in tandem with the microphone array 108 to generate images of, and enable directional viewing of, the sound source 608a-c from which the user 106 is listening. The image capturing device 310 comprises a panoramic lens 312 that enables the image capturing device 310 to capture an image 606 of the sound source 608a-c, 610a-b in the 360° range relative to the earpiece 102a-b.

In some embodiments, the system 100 utilizes a processor 302 that is operatively connected to the microphone array 108 and the image capturing device 310. The processor 302 is configured to analyze the audio signal 612 and the image 606, and then to selectively listen, restrict, and adjust the intensity of the sound.

The system 100 also provides an electronic circuitry 304 that is operatively connected to the processor 302. The electronic circuitry 304 generates a reproduced sound based on the captured audio signal 612. In some embodiments, the processor 302 selectively transmits the reproduced sound through the earpiece 102a-b. Further, the processor 302 restricts at least a portion of the reproduced sound from transmitting through the earpiece 102a-b.

Figure 2:
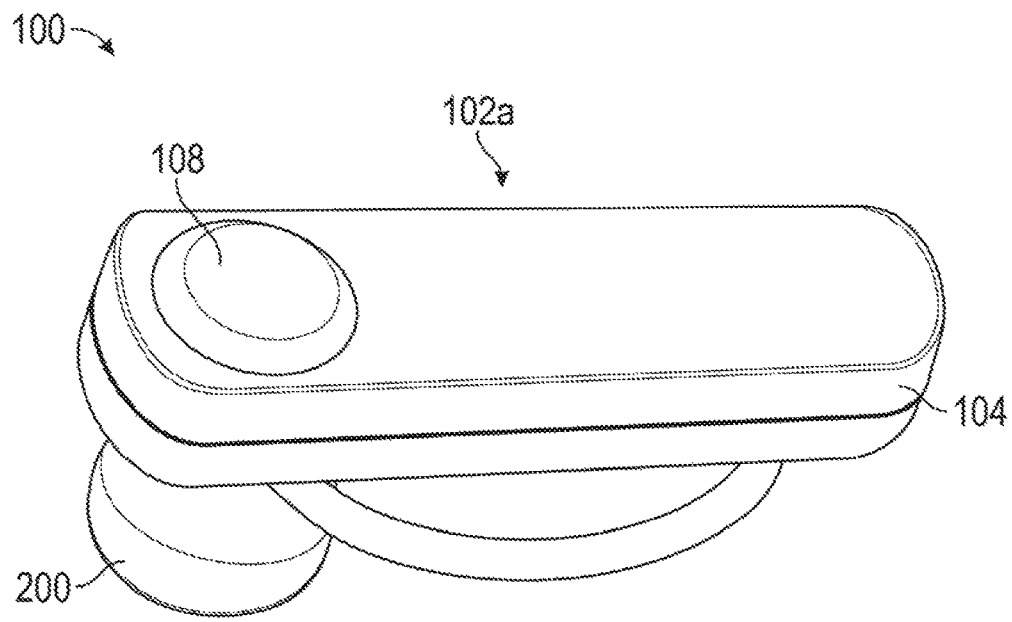
FIG. 2 illustrates a perspective view of the directional noise-cancelling and sound detection system, in accordance with an embodiment of the present invention.

Looking at FIG. 2, the system 100 comprises at least one earpiece 102a-b that is configured to be donned on the ear of a user 106 for directional noise-cancelling and targeted sound detection of at least one audio signal 612 from at least one sound source 608a-c, 610a-b. In one embodiment, a right earpiece 102a couples to the right ear and a left earpiece 102b couples to the left ear. The earpiece 102a-b may include a housing 104 that forms a protective shell for the electrical and processing components contained therein. The housing 104 may be rectangular, circular, or irregularly shaped.

In some embodiments, a mounting hook may attach to the housing 104 to enable wrapping around the ear for a secure fit. The housing 104 may also include an inlet 200, or channel, that captures and funnels the audio signal 612 from the sound source for processing inside the housing 104 (FIG. 2). In one non-limiting embodiment, the earpiece 102a-b may include the part of an instrument (such as a telephone, stethoscope, or hearing aid) that is placed against or inserted into the outer opening of the ear.

FIG. 1 shows the earpiece 102a-b being donned by a user 106 for enhanced and focused listening, as described below. By donning the at least one earpiece 102a-b directly on one or both ears, the user 106 can more effectively recognize the direction and intensity of the desired sound source 608a-c, 610a-b. The earpiece 102a-b may be inserted into or near the user's ear, so as to capture a 180° field of view from each side of the head; or attached to both ears to capture the 360° range 400 of audio signal 612. In one non-limiting embodiment, the earpiece 102a-b comprises Bluetooth connectivity with A2DP or HPF profiles.

The earpiece 102a-b comprises a microphone array 108, which is the primary means to capture the audio signal 612. The microphone array 108 focuses the captured audio signal 612 through microphone polarization or electronic processing of the audio signal 612. In this manner, the user 106 can rotate the head while wearing the earpiece 102a-b, and pick up a sound source 608a-c, 610a-b for more focused listening.

Figure 3:
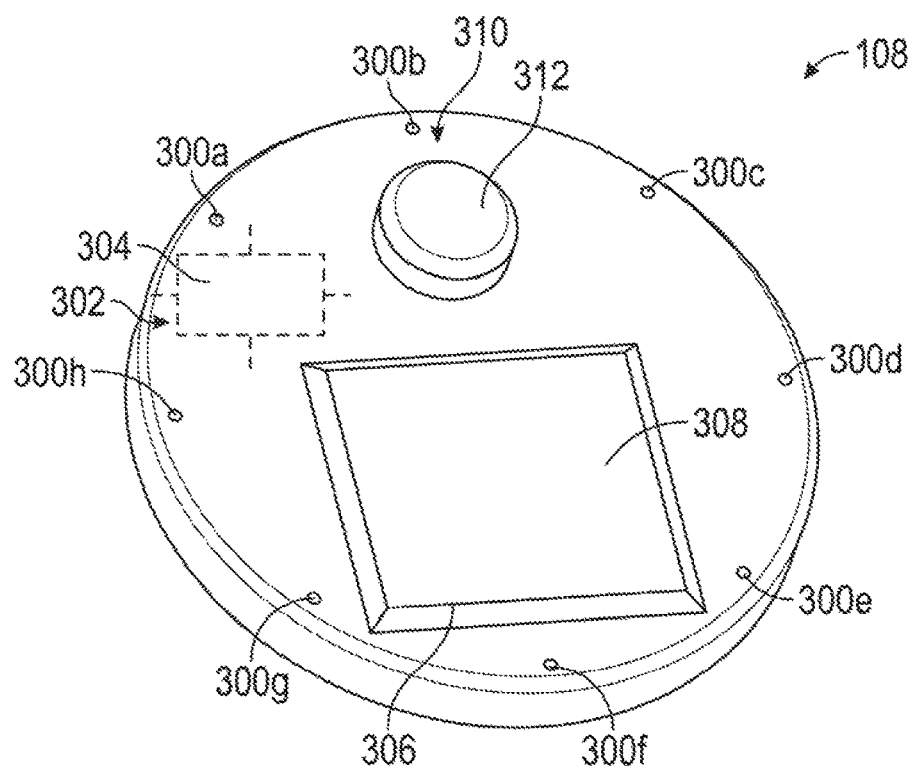
FIG. 3 illustrates a top perspective view of an exemplary microphone array, processor, and electrical circuitry, in accordance with an embodiment of the present invention.

As FIG. 3 illustrates, the microphone array 108 comprises a plurality of microphones that are operable to capture at least one audio signal 612 emanating from at least one sound source 608a-c, 610a-b. The sound source 608a-c, 610a-b may include a person, an animal, or an object that emanates sound or thermal energy in an environment, and that is in close proximity to other people, animals, and objects that emanate competing audio signals.

The microphones 300a-h work to convert sound vibrations from the audio signal 612 to an electric current, which is then converted into reproduced sound. The array of microphones 300a-h are arranged to enable directional noise-cancelling of an audio signal 612 emanating from at least one sound source 608a-c, 610a-b. The microphones also work together to enable detection of the audio signal 612 emanating from the sound source 608a-c, 610a-b.

The microphones 300a-h are similar in their directionality, with the major difference between microphones being their position along the planar array however. Thus, the microphones 300a-h capture the audio signal 612 in substantially the same manner, and along the same plane.

Figure 4:
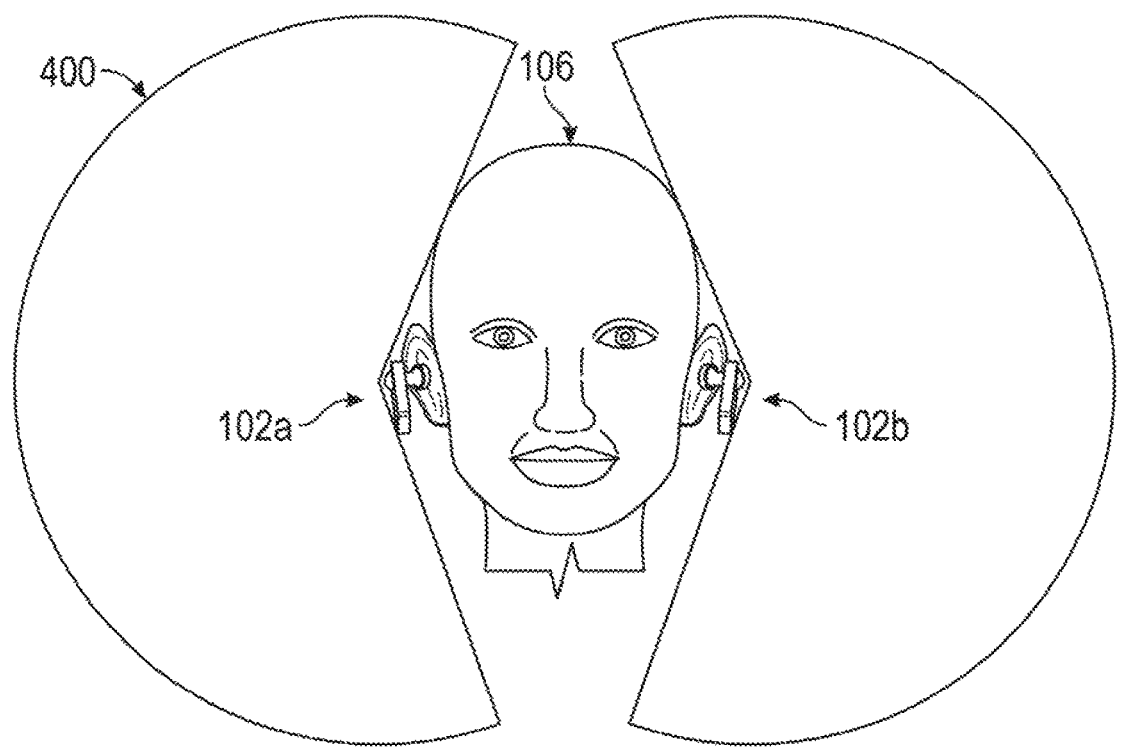
FIG. 4 illustrates a frontal view of a user donning the earpiece and capturing audio signals from a 360° range, in accordance with an embodiment of the present invention.

Looking now at FIG. 4, the microphones 300a-h capture the audio signal 612 in a 360° range relative to the earpiece. Though the range can be adjusted, so that the microphone array 108 focuses on a specific audio signal 612 in a range greater or smaller than 360°. Thus, the microphones include an omnidirectional microphone, or a directional microphone. All the microphones must, however, have the same directional orientation, so as to allow for consistent sound recording.

In one non-limiting embodiment, the plurality of microphones 300a-h include eight microphones 300a, 300b, 300c, 300d, 300e, 300f, 300g, 300h arranged in a circular configuration and in a planar array. Though in other embodiments, more or less microphones may be used and positioned orthogonally from each other, whereby the microphones are not on the same plane. Those skilled in the art will recognize that the microphone array 108 applies principles of noise amplification and cancellation to achieve the targeted listening, and noise-cancelling functions described in the present invention.

The system 100 may further include an image capturing device 310 that is configured to capture an image 606 of the sound source 608a-c, 610a-b. This allows the user 106 to not only selectively listen to the audio signal 612, but also to view the source of the audio signal 612 in a targeted manner. Further, the microphone array 108 may utilize thermal signatures or optical signatures from the image capturing device 310 to adjust the noise cancelling function, so as to better pinpoint and follow the sound source 608a-c.

Figure 5:
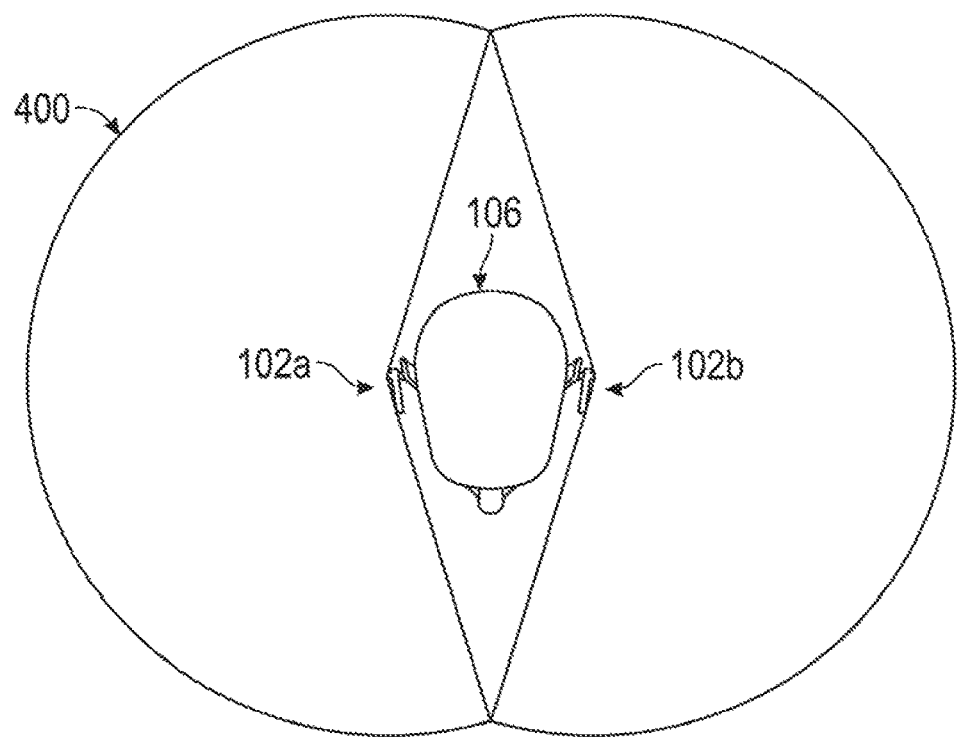
FIG. 5 illustrates a top view of the user donning the earpiece and capturing audio signals from a 360° range, in accordance with an embodiment of the present invention.
Figure 6:
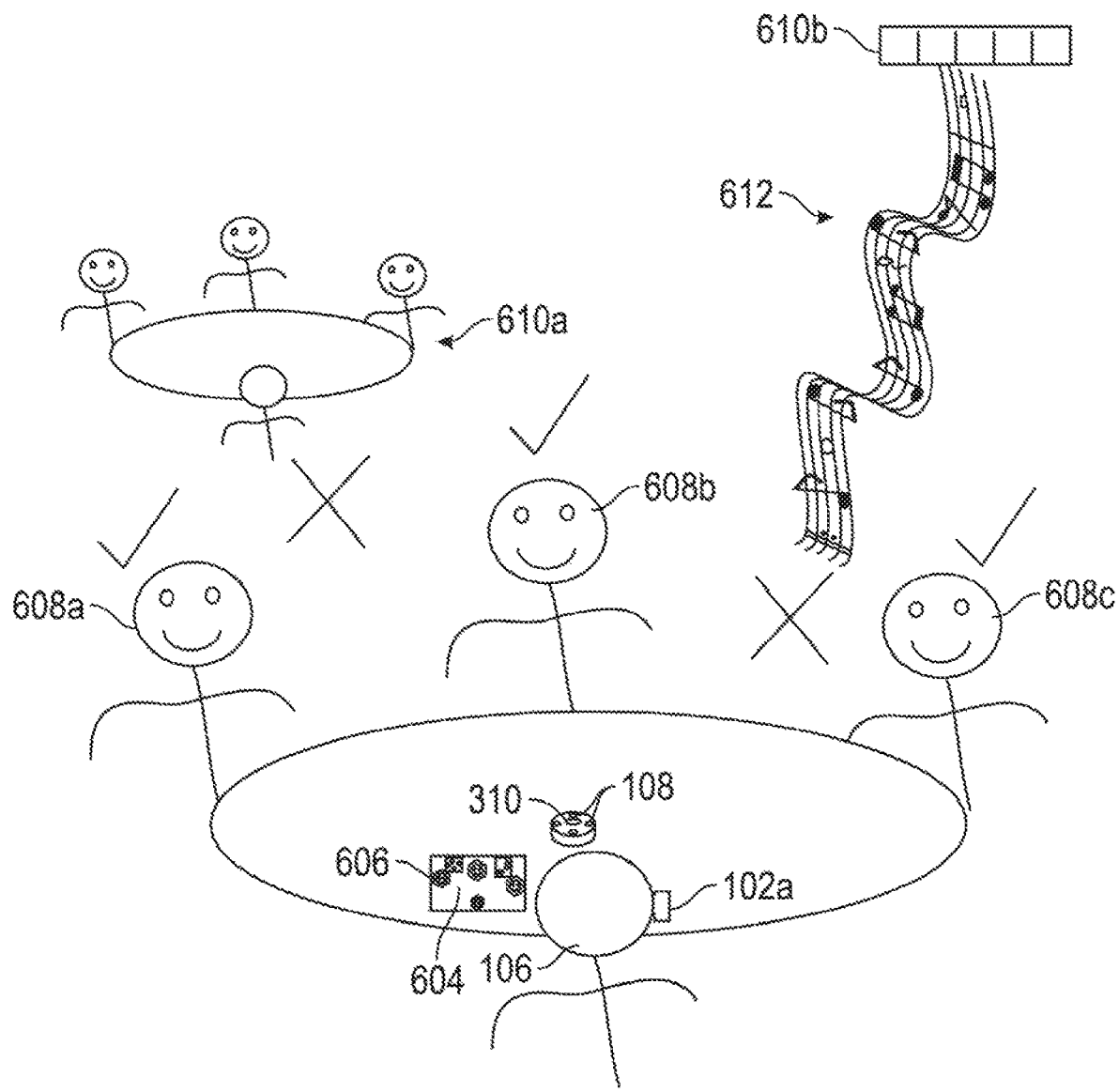
FIG. 6 illustrates a user listening to selected audio signals from proximal sound sources, and restricting noise from distal sound sources and background noise through use of a mobile communication device, in accordance with an embodiment of the present invention.

The image capturing device 310 may be attached directly to the earpiece 102a-b, being inserted into or near the user's ear, so as to capture a 180° field of view from each side of the head (FIG. 5). Or the image capturing device 310 may be operable on a remote device that could sit on a tabletop or other such location giving a single 360° field of view relative to the user 106. Such a table top disposition of the image capturing device 310 is shown in FIG. 6.

The image 606, or in some embodiments, the thermal signature, captured by the image capturing device 310 may be combined with the captured audio signal 612 to process identification and tracking of the sound source 608a-c, 610a-b. In other embodiments however, the audio signal 612, or the image 606, alone is used to identify and track the sound source 608a-c, 610a-b.

In one non-limiting embodiment, the image capturing device 310 comprises a panoramic lens 312, such as an ultra-wide angle fisheye lens. The panoramic lens 312 allows the image capturing device 310 to capture an image 606 of the sound source 608a-c, 610a-b in the 360° range relative to the earpiece. The panoramic lens 312 helps to capture images, thermal signatures, and optical signatures of the sound source 608a-c, 610a-b. Further, the panoramic lens 312 is configured to enable viewing wide format photography, thermal signatures, facial recognition, and optical signatures of the sound source 608a-c, 610a-b in a 360° range 400 from the earpiece 102a-b.

In some embodiments, the image capturing device 310 may include, without limitation, a camera, a fisheye visual daylight camera, a thermal imager, a LiDAR, radar, and a device for generating an electronic image of the environment. In another non-limiting embodiment, the panoramic lens 312 comprises a rotating mirror, or a stationary mirror.

Looking ahead to FIG. 6, an exemplary user 106 listens to selected audio signals 612 from proximal sound sources 608a, 608b, 608c and distal sound sources 610a and background noise 610b through the earpiece 102a. A mobile communication device 604 is used to select the desired audio signal 612. The mobile communication device 604 also displays an image 606 of the proximal sound sources 608a-c that the user 106 listens to.

Thus, through the mobile communication device 604, and an accompanying software app, the microphone array 108 enables selective listening to multiple people 608a-c sitting at the same table, while also restricting sounds from people in adjacent tables 610a and background music 612 from a speaker 610b. The mobile communication device 604 also displays an image 606 of the people 608a-c sitting at the same table of the user 106. This targeted and restrictive listening can be useful for targeted listening in a crowded room, as shown in the illustration.

The system 100 may further include a processor 302 that is operatively connected to the microphone array 108 and the image capturing device 310 (FIG. 3). The processor 302 is configured to analyze the audio signal 612 and the image 606, and then to selectively enable transmission through the earpiece 102a-b, selectively restrict the generated sound, and adjust the intensity of the reproduced sound.

Furthermore, the processor 302 allows the microphone array 108 and the image capturing device 310 to work in conjunction to simultaneously track audio signals from the sound source 608a-c, 610a-b, and capture and view the image 606 of the sound source 608a-c. The image capturing device does not require motion, rotation, and the like to track and capture the sound source because of the panoramic lens 312 that captures a 360° range.

The processor 302 also processes the audio signals entering the earpiece 102a-b so that a frequency shift occurs with the sound. It is known in the art that people with hearing impairments lose the ability to hear high pitched, and mid-range sounds which makes speech recognition and intelligibility difficult.

Thus, it is also known that hearing aids simply increase the volume of the frequencies that the user 106 has difficulty hearing, because most hearing loss is in the mid to upper frequency registers, and low frequency sounds are relatively unaffected. The system 100 takes the high and mid frequencies and shifts them in frequency to lower registers where the user 106 has a better chance to understand them.

In one non-limiting embodiment, the processor 302 utilizes microphone polarization to focus the captured audio signal 612 through the earpiece 102a-b. The processor 302 may include, without limitation, a CPU, a microprocessor, or a microchip. In some embodiments the processor 302 includes firmware and/or software that are operable to analyze the audio signal 612 and reproduced sound. The capacity of the processor 302 to analyze the electrical current generated by the vibration of the audio signals is efficacious for targeting the sound source 608a-c, 610a-b, adjusting the intensity of the incoming audio signal 612, restricting undesirable sounds and background noise 610a-b, and capturing an image 606 or video of the sound source 608a-c.

The system 100 may further include an electronic circuitry that is operatively connected to the processor 302. The electronic circuitry generates a reproduced sound based on the captured audio signal 612. The electronic circuitry may include various wires, resistors, transistors, capacitors, inductors, and diodes that are connected by conductive wires or traces through which electric current can flow.

Looking again at FIG. 3, the system 100 provides a digital display control unit 306 that is operatively connected to the microphones 300a-h and the processor 302. The digital display control unit 306 may include a graphical user interface (GUI) 308, a button, and a digital screen that allows the user 106 to control and view the sound and video functions. The digital display control unit 306 works to regulate selection of the reproduced sound transmitted through the earpiece. The digital display control unit 306 further works to regulate the intensity of the reproduced sound that is transmitted through the earpiece 102*a-b*.

The digital display control unit 306 further works to regulate the portion of the reproduced sound that is restricted from passing through the earpiece 102*a-b*. The digital display control unit 306 further works to display the image 606 of the sound source 608*a-c*, 610*a-b* that is captured by the image capturing device 310. In this manner, the directionality of the microphones is based on the audio signal 612 and the image 606. Through the array arrangement of microphones, and the capacity to regulate the audio signals entering the earpiece, the system 100 focuses on the audio signals and/or image 606 of the sound source 608*a-c*, 610*a-b*, so as to enable focused listening, and restricted listening to the audio signal 612.

For example, as shown in FIG. 6, the voice and image 606 of a person 608*a* in a loud, crowded room can be focused, intensified, and directionally targeted for listening, while substantially blocking out noise emanating from other people and objects 610*a-b*. Further, the person, i.e., sound source 608*a*, can be viewed as an image 606 or video on the GUI 308 or a mobile communication device 604.

The intensity of the audio signal 612 that is allowed to be received through the microphones is controllable by the user 106 through a remote mobile communication device 604 118, or the digital display control unit 306 that is integrated into the earpiece 102*a-b*. In this manner, the primary user 106 controls the microphone array 108 and microphone noise-cancelling array 116 to select the noise-cancelling and targeted sound detection of a plurality of secondary users wearing secondary earpieces.

Or in another example, as the user 106 turns the head, the audio signal 612 from the sound source 608*a* is increased in intensity for a more focused listening. Or optical or thermal signatures of the sound source 608*a* may be captured to adjust the amount of noise cancelled from non-sound source entities 610*a-b*. This can be useful for military identifying of a sound source, or for use in a hearing aid to assist a hearing impaired user.

In addition to, or in lieu of, the digital display control unit 306, the system may utilize a mobile communication device 604 to perform substantially the same functions. Thus, the intensity and focus of the audio signal 612 can be adjusted through a touchscreen, or a smartphone app. The adjustments allow the user 106 to make intricate adjustments and choose multiple sound sources 608*a-c* of interest, such as a television in front of the user and a baby sleeping behind and to the left, while canceling undesirable sound 612*a-b*, such as the neighbor's lawnmower on the right side, for example.

Similar to the digital display control unit 306 that is integral in the earpiece 102*a-b*; the system 100 may also use a remote mobile communication device 604 that still operatively connects to the microphones 300*a-h* and the processor 302. In some embodiments, the mobile communication device 604 regulates selection of the reproduced sound transmitted through the earpiece. A software app may be downloaded for use on the mobile communication device 604.

In other embodiments, the mobile communication device 604 regulates the intensity of the reproduced sound transmitted through the earpiece 102*a-b*. In yet other embodiments, the mobile communication device 604 regulates the portion of the reproduced sound restricted through the earpiece 102*a-b*. And similar to the digital display control unit 306, the mobile communication device 604 displays the image 606 of the sound source 608*a-c* while the user is listening.

In another exemplary use of the system 100, audio signals are focused narrowly on a television; thereby ignoring all other sounds in the room. This could be frustrating for the persons spouse trying to have sporadic conversation during a commercial. So the capacity to adjust the listening range can be adjusted through the digital display control unit 306 or the mobile communication device 604 to widen the listening range around the earpiece 102*a-b*. In this manner, if a spouse calls a specific voice command or name, the narrow focus of the sound is widened to include the spouse's voice. The user may then select to listen to the sound from the television over the spouse as the digital display control unit 306 regulates the intensity and type of audio signals transmitted through the earpieces 102*a-b*.

In yet another exemplary use of the system 100, the microphone array 108 allows the user 200 who is located in a crowded noisy restaurant, and has difficulty hearing a conversation from his dinner guest, the capacity to focus listening on a specific person. The microphone array 108 allows the user to focus sounds the user hears to listen to the dinner guest, and actively decrease competing, undesirable sounds that emanate from the room. And by having adjusting the intensity of the audio signal 612 from the dinner guest, the user could increase the focus to a wider field to add several dinner guests.

Figure 7A:
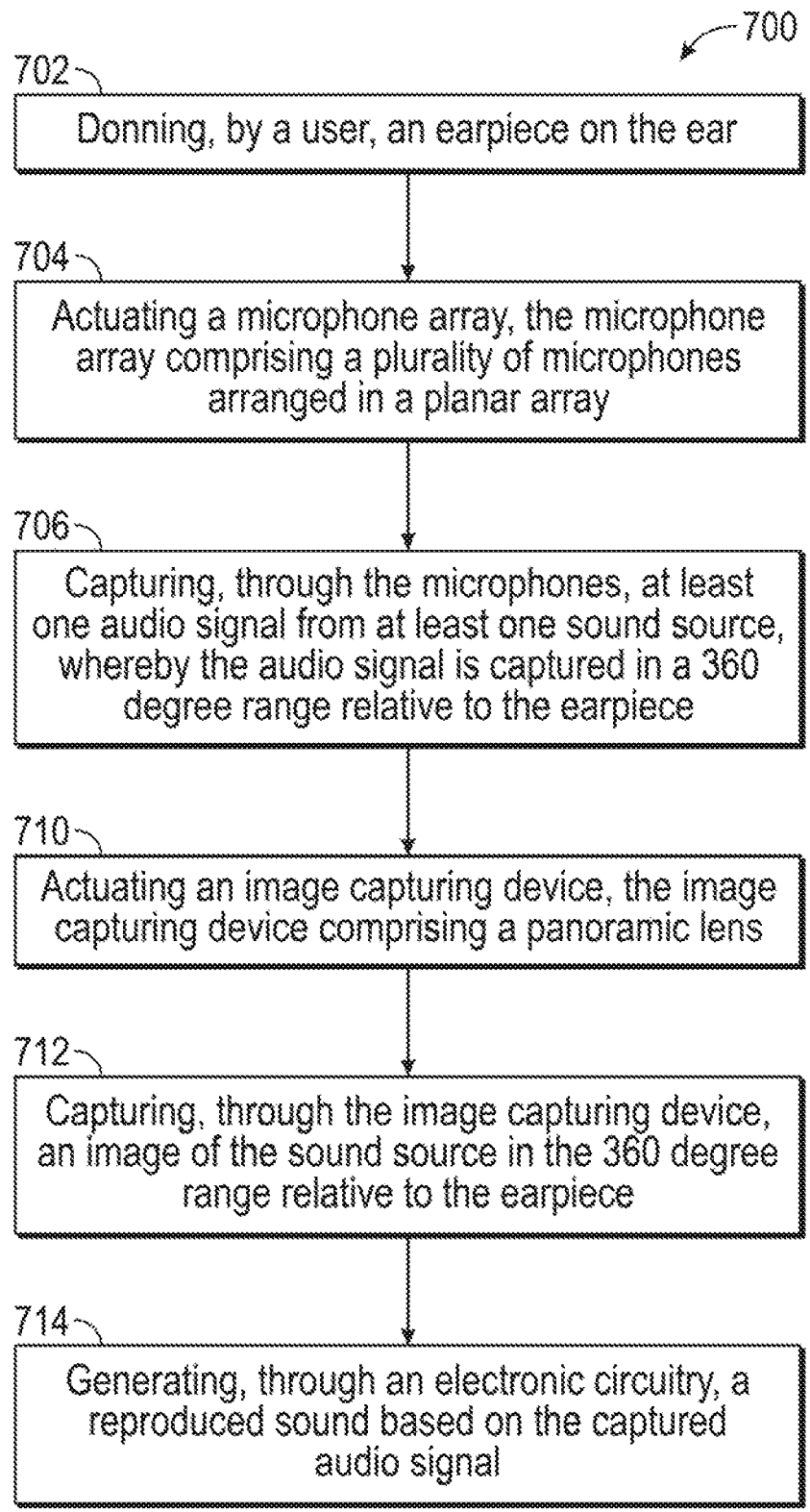
FIGS. 7A and 7B illustrate a flowchart of an exemplary method for sound targeted hearing and imaging with a directional noise-cancelling and sound detection system.
Figure 7B:
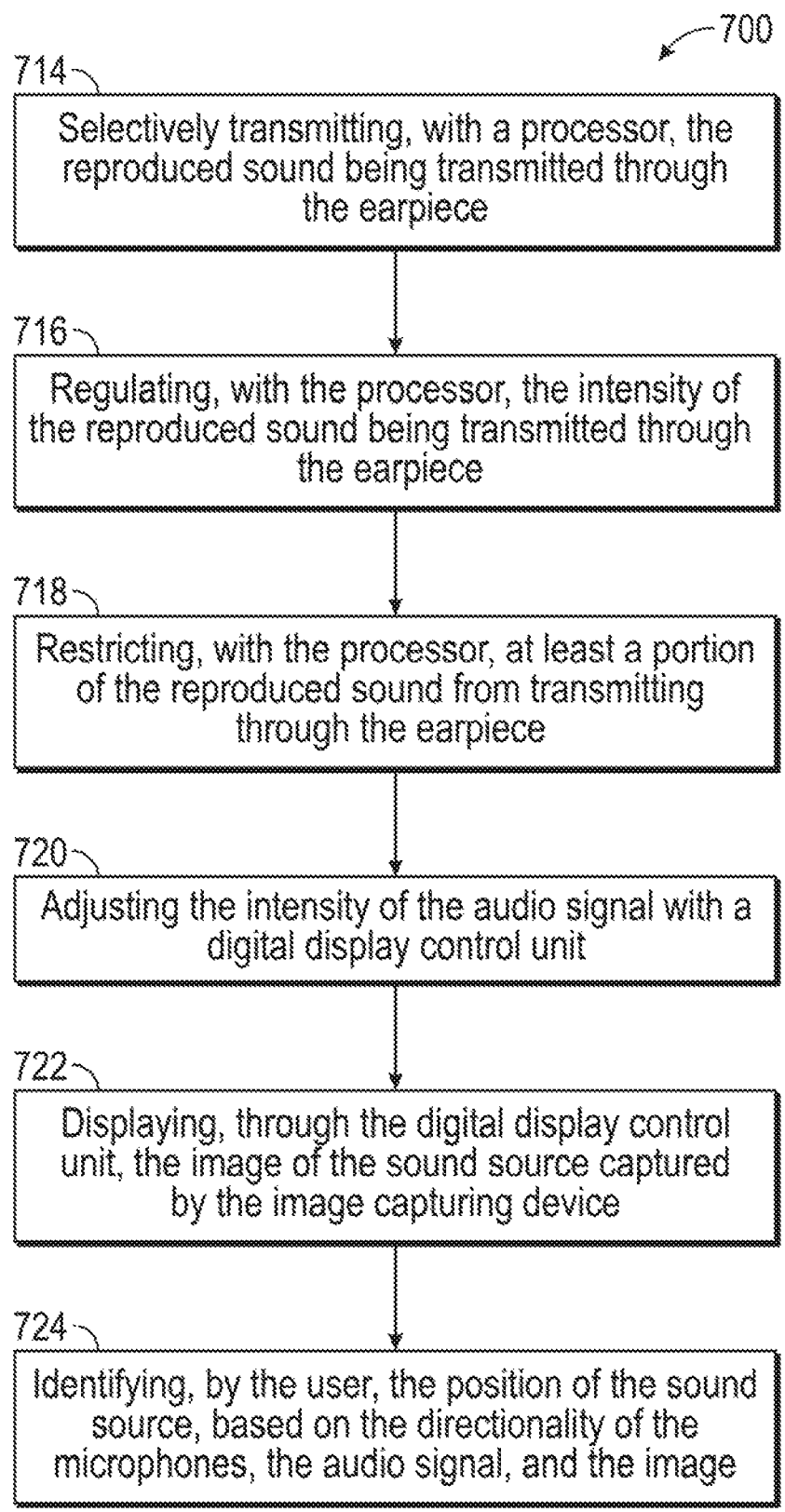

FIGS. 7A and 7B illustrate a flowchart of an exemplary method 700 for sound targeted hearing and imaging with a directional noise-cancelling and sound detection system. The method 700 may include an initial Step 702 of donning, by a user, an earpiece on the ear. The earpiece 102*a-b* is configured to be donned on the ear of a user 106 for directional noise-cancelling and targeted sound detection of at least one audio signal 612 from at least one sound source 608*a-c*, 610*a-b*. In one embodiment, a right earpiece 102*a* couples to the right ear and a left earpiece 102*b* couples to the left ear.

The method 700 may further comprise a Step 704 of actuating a microphone array, the microphone array comprising a plurality of microphones arranged in a planar array. As FIG. 3 illustrates, the microphone array 108 comprises a plurality of microphones that are operable to capture at least one audio signal 612 emanating from at least one sound source 608*a-c*, 610*a-b*.

A Step 706 includes capturing, through the microphones, at least one audio signal from at least one sound source, whereby the audio signal is captured in a 360° degree range relative to the earpiece. The arrayed arrangement of microphones 300*a-h* enable this 360° capacity to capture audio signals 612.

In some embodiments, the method 700 comprises a Step 708 of actuating an image capturing device, the image capturing device comprising a panoramic lens. The image capturing device 310 that is configured to capture an image 606 of the sound source 608*a-c*, 610*a-b*. This allows the user 106 to not only selectively listen to the audio signal 612, but also to view the source of the audio signal 612 in a targeted manner. Further, the microphone array 108 may utilize thermal signatures or optical signatures from the image capturing device 310 to adjust the noise cancelling function, so as to better pinpoint and follow the sound source 608*a-c*, 610*a-b*.

In other embodiments, a Step 710 includes capturing, through the image capturing device, an image of the sound source in the 360 degree range relative to the earpiece. A Step 712 may include generating, through an electronic circuitry, a reproduced sound based on the captured audio signal. A Step 714 comprises selectively transmitting, with a processor, the reproduced sound being transmitted through the earpiece.

The method 700 may further comprise a Step 716 of regulating, with the processor, the intensity of the reproduced sound being transmitted through the earpiece. A Step 718 includes restricting, with the processor, at least a portion of the reproduced sound from transmitting through the earpiece. The restriction can be adjusted with the digital display control unit 306 or the mobile communication device 604. Another Step 720 may include adjusting the intensity of the audio signal with a digital display control unit. The intensity can be adjusted with the digital display control unit 306 or the mobile communication device 604.

A Step 722 comprises displaying, through the digital display control unit, the image of the sound source captured by the image capturing device. The image matches the sound that the user 106 is listening to, as the panoramic lens 312 of the image capturing device 310 enables 360° viewing of proximal sound sources. A final Step 724 includes identifying, by the user, the position of the sound source based on the directionality of the microphones, the audio signal, and the image. The system 100 is operable to equivalently define a directivity by emphasizing a target sound 608a-c and suppressing noise 610a-b while being donned onto one or both ears of the user 106.

Although the process-flow diagrams show a specific order of executing the process steps, the order of executing the steps may be changed relative to the order shown in certain embodiments. Also, two or more blocks shown in succession may be executed concurrently or with partial concurrence in some embodiments. Certain steps may also be omitted from the process-flow diagrams for the sake of brevity. In some embodiments, some or all the process steps shown in the process-flow diagrams can be combined into a single process.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A directional noise-cancelling and sound detection system, the system comprising:
    at least one earpiece each having:
        a microphone array, the microphone array comprising a plurality of microphones operable to capture at least one audio signal emanating from at least one sound source, the microphones capturing the audio signal in a 360 degree range relative to the earpiece;
        the plurality of microphones of the microphone array arranged in a circular configuration and in a planar array, wherein the plurality of microphones captures the at least one audio signal in a 360° range relative to the at least one earpiece;
        an image capturing device, the image capturing device comprising a panoramic lens, the image capturing device capturing an image of the sound source in the 360 degree range relative to the earpiece;
        a processor operatively connected to the microphone array and the image capturing device, the processor operable to process the audio signal and the image;
        an electronic circuitry operatively connected to the processor, the electronic circuitry generating a reproduced sound based on the captured audio signal,
        whereby the processor selectively transmits the reproduced sound through the earpiece,
        whereby the processor restricts at least a portion of the reproduced sound from transmitting through the earpiece; and
        a digital display control unit operatively connected to the microphones and the processor,
        the digital display control unit regulating selection of the reproduced sound transmitted through the earpiece,
        the digital display control unit further regulating the intensity of the reproduced sound transmitted through the earpiece,
        the digital display control unit further regulating the portion of the reproduced sound restricted through the earpiece,
        the digital display control unit further displaying the image of the sound source,
        whereby detection of the sound source is based on the directionality of the microphones, the audio signal, and the image.

2. The system of claim 1, wherein the microphones comprise a directional microphone.

3. The system of claim 1, wherein the microphones comprise an omnidirectional-microphone.

4. The system of claim 1, wherein the earpiece comprises a housing.

5. The system of claim 1, wherein the processor utilizes microphone polarization to focus the captured audio signal through the earpiece.

6. The system of claim 1, wherein the image capturing device includes at least one of the following: a camera, a fisheye visual daylight camera, a thermal imager, a LiDAR, a radar, and a device for generating an electronic image of the environment.

7. The system of claim 1, wherein the image capturing device comprises a rotating mirror, or a stationary mirror, or both.

8. The system of claim 1, wherein the image capturing device is operable while integral with the earpiece.

9. The system of claim 1, wherein the image capturing device is remotely operable with the earpiece.

10. The system of claim 1, wherein the panoramic lens of the image capturing device comprises an ultra-wide angle fisheye lens.

11. The system of claim 1, wherein the digital display control unit comprises a graphic user interface.

12. The system of claim 1, wherein the earpiece comprises Bluetooth connectivity with A2DP or HPF profiles.

13. The system of claim 1, further comprising a mobile communication device, the mobile communication device operatively connected to the microphones and the processor.

14. The system of claim 13, wherein the mobile communication device regulates selection of the reproduced sound transmitted through the earpiece.

15. The system of claim 14, wherein the mobile communication device regulates the intensity of the reproduced sound transmitted through the earpiece.

16. The system of claim 15, wherein the mobile communication device regulates the portion of the reproduced sound restricted through the earpiece.

17. The system of claim 16, wherein the mobile communication device displays the image of the sound source.

18. A directional noise-cancelling and sound detection system, the system consisting of:
- at least one earpiece comprising a housing defined by an inlet, the earpiece each having:
  - a microphone array, the microphone array comprising a plurality of microphones arranged in a planar array, the microphones being operable to capture at least one audio signal emanating from at least one sound source, the microphones capturing the audio signal in a 360 degree range relative to the earpiece;
  - the plurality of microphones of the microphone array arranged in a circular configuration and in a planar array, wherein the plurality of microphones captures the at least one audio signal in a 360° range relative to the at least one earpiece;
  - an image capturing device, the image capturing device comprising a panoramic lens, the image capturing device capturing an image of the sound source in the 360 degree range relative to the earpiece;
  - a processor operatively connected to the microphone array and the image capturing device, the processor operable to process the audio signal and the image;
  - an electronic circuitry operatively connected to the processor, the electronic circuitry generating a reproduced sound based on the captured audio signal,
  - whereby the processor selectively transmits the reproduced sound through the earpiece,
  - whereby the processor restricts at least a portion of the reproduced sound from transmitting through the earpiece; and
  - a digital display control unit operatively connected to the microphones and the processor, the digital display control unit comprising a graphic user interface,
  - the digital display control unit regulating selection of the reproduced sound transmitted through the earpiece,
  - the digital display control unit further regulating the intensity of the reproduced sound transmitted through the earpiece,
  - the digital display control unit further regulating the portion of the reproduced sound restricted through the earpiece,
  - the digital display control unit further displaying the image of the sound source,
  - whereby detection of the sound source is based on the directionality of the microphones, the audio signal, and the image.

19. A method for sound targeted hearing and imaging with a directional noise-cancelling and sound detection system, the method comprising:
- donning, by a user, at least one earpiece on the ears, each of the at least one earpiece having a microphone array;
- actuating the microphone array, the microphone array comprising a plurality of microphones arranged in a circular and planar array;
- capturing, through the microphones, at least one audio signal from at least one sound source, whereby the audio signal is captured in a 360 degree range relative to the earpiece;
- actuating an image capturing device, the image capturing device comprising a panoramic lens;
- capturing, through the image capturing device, an image of the sound source in the 360 degree range relative to the earpiece;
- generating, through an electronic circuitry, a reproduced sound based on the captured audio signal;
- selectively transmitting, with a processor, the reproduced sound being transmitted through the earpiece;
- regulating, with the processor, the intensity of the reproduced sound being transmitted through the earpiece;
- restricting, with the processor, at least a portion of the reproduced sound from transmitting through the earpiece;
- adjusting the intensity of the audio signal with a digital display control unit;
- displaying, through the digital display control unit, the image of the sound source captured by the image capturing device; and
- identifying, by the user, the position of the sound source, based on the directionality of the microphones, the audio signal, and the image.

* * * * *